United States Patent [19]

Kishi et al.

[11] Patent Number: 4,491,109
[45] Date of Patent: Jan. 1, 1985

[54] IDLING RPM FEEDBACK CONTROL METHOD HAVING FAIL-SAFE FUNCTION FOR ABNORMALITIES IN THE FUNCTIONING OF THE THROTTLE VALVE OPENING DETECTING MEANS OF AN INTERNAL COMBUSTION ENGINE

[75] Inventors: Noriyuki Kishi, Tokyo; Takashi Koumura, Saitama, both of Japan

[73] Assignee: Honda Motor Co., Ltd., Tokyo, Japan

[21] Appl. No.: 489,251

[22] Filed: Apr. 27, 1983

[30] Foreign Application Priority Data

May 7, 1982 [JP] Japan .................................. 57-76357

[51] Int. Cl.³ ................................................ F02M 3/00
[52] U.S. Cl. ........................................ 123/339; 123/586
[58] Field of Search .......................... 123/339, 586, 587

[56] References Cited

U.S. PATENT DOCUMENTS

| | | | |
|---|---|---|---|
| 4,106,451 | 8/1978 | Hattori et al. | 123/586 |
| 4,168,680 | 9/1979 | Kawai et al. | 123/339 |
| 4,182,295 | 1/1980 | Zeller et al. | 123/586 |
| 4,240,145 | 12/1980 | Yano et al. | 123/587 |
| 4,344,398 | 8/1982 | Ikeura | 123/339 |
| 4,378,768 | 4/1983 | Itoh et al. | 123/339 |
| 4,385,602 | 5/1983 | Itou et al. | 123/339 |

FOREIGN PATENT DOCUMENTS 0085537 7/1981 Japan .................................. 123/339

*Primary Examiner*—Parshotam S. Lall
*Attorney, Agent, or Firm*—Arthur L. Lessler

[57] ABSTRACT

An idling rpm feedback control method for controlling control means that controls the quantity of supplementary air being supplied to an internal combustion engine in a feedback manner, in response to the difference between actual engine rpm and desired idling rpm at engine idling, when all predetermined engine operating parameters at least including the throttle valve opening show values satisfying a predetermined condition. When the throttle valve opening detecting means malfunctions, control is effected by maximizing the quantity of supplementary air to the engine by operating the above supplementary air quantity control means to its operating limit. The supplementary air quantity control means comprises (1) a solenoid valve arranged across an air passage for controlling the supplementary air quantity through the above air passage, one end of which communicates with the intake passage of the engine at a location downstream of a throttle valve arranged therein and the other end with the atmosphere, respectively, or (2) a negative pressure-operated means for operating the aforesaid throttle valve in repsonse to the amount of negative pressure in the intake passage at a zone downstream of the throttle valve, and a negative pressure control means for controlling the amount of negative pressure in the intake passage, that acts upon the negative pressure-operated means.

5 Claims, 4 Drawing Figures

IDLING RPM FEEDBACK CONTROL METHOD HAVING FAIL-SAFE FUNCTION FOR ABNORMALITIES IN THE FUNCTIONING OF THE THROTTLE VALVE OPENING DETECTING MEANS OF AN INTERNAL COMBUSTION ENGINE

BACKGROUND OF THE INVENTION

This invention relates to an idling rpm feedback control method for internal combustion engines, and more particularly to a method of this kind which is adapted to control the engine rpm at engine idling even if maximum engine load is applied on the engine when an abnormality occurs in the throttle valve opening detecting system, so as to prevent engine stall.

In an internal combustion engine, the engine can easily stall due to a drop in the engine speed when the engine is operated in an idling condition at a low temperature of the engine cooling water or when the engine is heavily loaded with loads by head lamps, air conditioner, etc. in a vehicle equipped with the engine. To eliminate such disadvantage, an idling rpm feedback control method has been proposed e.g. by Japanese Patent Provisional Publication (Kokai) No. 55-98628, which comprises setting desired idling rpm in dependence upon load on the engine, detecting the difference between actual engine rpm and the desired idling rpm, and supplying supplementary air to the engine in a quantity corresponding to the detected difference so as to minimize the same difference, to thereby control the engine rpm to the desired idling rpm.

According to this method, when the throttle valve is not fully closed, that is, when the throttle pedal is being operated, it is not necessary to apply feedback control of the engine rpm, as the engine rpm can be adjusted in accordance with the throttle pedal operating manner of the driver. Thus, one of the conditions for applying feedback control during engine idling is that the throttle valve should remain fully closed. However, if any abnormality occurs in the throttle valve opening detecting means, the idling rpm control device can make a wrong diagnosis that the throttle valve is not fully closed, despite the engine being in an idling state with the throttle valve fully closed, and consequently the supply of supplementary air to be supplied in feedback control can be interrupted, resulting in an abrupt drop in the engine rpm and even in engine stall depending on the magnitude of the engine load.

SUMMARY OF THE INVENTION

It is the object of this invention to provide an idling rpm feedback control method which is adapted to make a supplementary air quantity control means to perform a fail-safe function to counteract any abnormality in the functioning of the throttle valve opening value detecting means so as to prevent engine stall even if maximum engine load is applied on the engine, at engine idle.

According to this invention, a method is provided for controlling a supplementary air quantity control means for regulating the quantity of supplementary air being supplied to an internal combustion engine having an intake passage and a throttle valve arranged therein, in a feedback manner responsive to the difference between actual engine rpm and desired idling rpm, when all predetermined engine operating parameters including at least the throttle valve opening show values satisfying a predetermined condition.

The method is characterized by comprising the following steps: determining whether or not a signal indicative of the throttle valve opening from the throttle valve opening detecting means shows an abnormal value; and supplying a maximum quantity of supplementary air to the engine by operating the supplementary air quantity control means to its operating limit, when it is determined that the above signal indicative of the throttle valve opening value shows an abnormal value.

Preferably, the above supplementary air quantity control means comprises (1) a solenoid valve for controlling the quantity of supplementary air being supplied to the engine through an air passage one end of which communicates with the aforesaid intake passage at a location downstream of the throttle valve arranged therein and the other end with the atmosphere, respectively, or (2) a negative pressure-operated means for operating the above throttle valve to open or close in response to negative pressure in the intake passage at a zone downstream of the throttle valve, and a negative pressure control means for controlling the value of negative pressure in the intake passage that acts upon the negative pressure-operated means.

Preferably, when the value of the signal indicative of the throttle valve opening value from the throttle valve opening detecting means continues to remain outside a range between predetermined upper and lower limits for a predetermined period of time, it is determined that there is an abnormality in the above throttle valve opening value.

The above and other objects, features and advantages of the invention will be more apparent from the ensuing detailed description taken in conjunction with the accompanying drawings.

DETAILED DESCRIPTION

The method of the invention will be described in detail with reference to the accompanying drawings.

Figure 1:
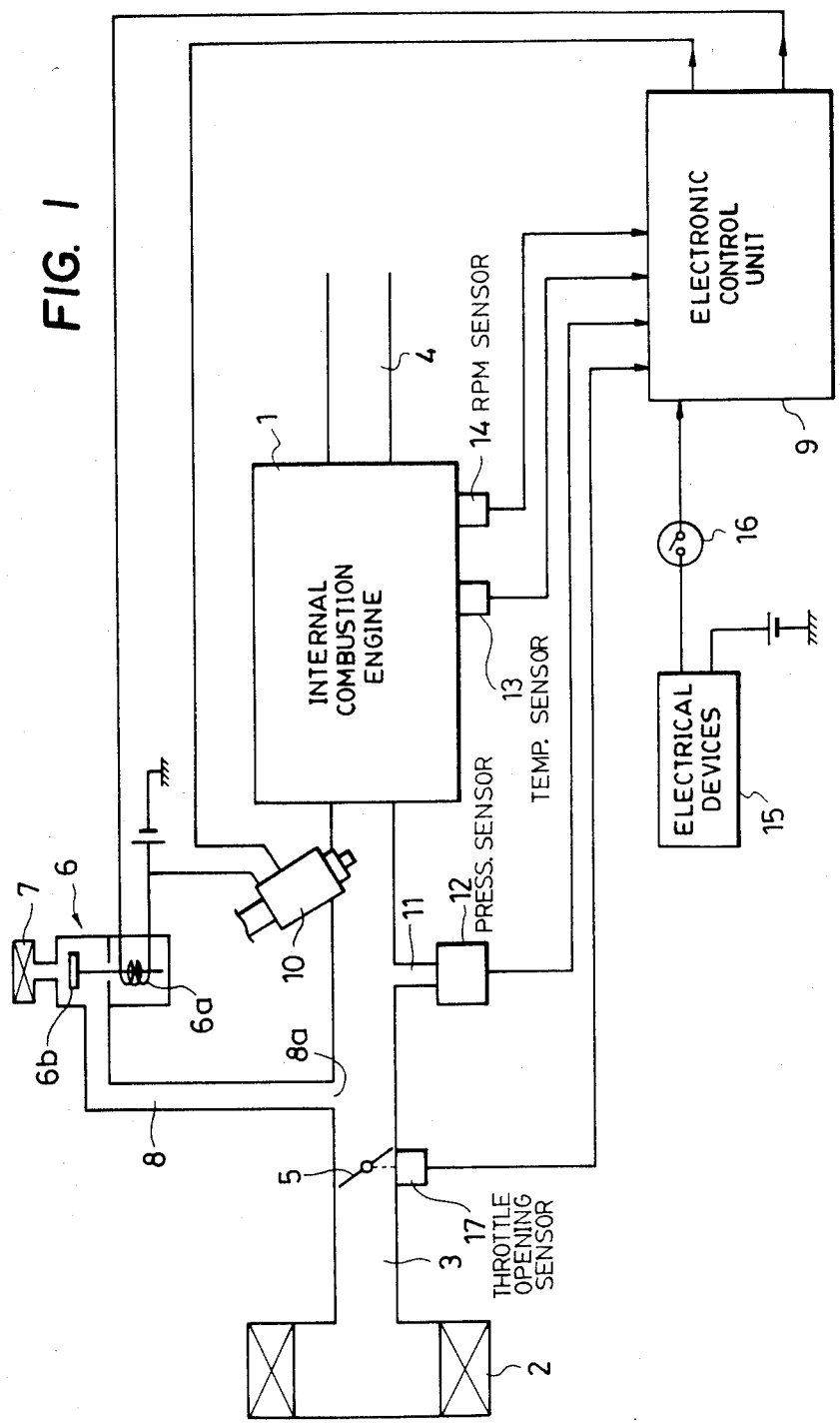
FIG. 1 is a block diagram illustrating, by way of example, the whole arrangement of an idling rpm feedback control system to which the method of the present invention is applied.

Referring first to FIG. 1, an idling rpm feedback control system is schematically illustrated, to which is applicable the method of the invention. In FIG. 1, reference numeral 1 designates an internal combustion engine which may be a four-cylinder type, and to which are connected an intake pipe 3 with an air cleaner 2 mounted at its open end and an exhaust pipe 4, at an intake side and an exhaust side of the engine 1, respectively. A throttle valve 5 is arranged within the intake pipe 3, and an air passage 8 opens at its one end 8a in the intake pipe 3 at a location downstream of the throttle valve 5. The air passage 8 has its other end communicating with the atmosphere and provided with an air cleaner 7. A supplementary air quantity control valve (hereinafter called merely "the control valve") 6 is arranged across the air passage 8 to control the quantity of supplementary air being supplied to the engine 1 through the air passage 8. This control valve 6 is a normally closed type and comprises a solenoid 6a and a valve 6b disposed to open the air passage 8 when the solenoid 6a is energized. The solenoid 6a is electrically connected to an electronic control unit (hereinafter called "ECU") 9. A fuel injection valve 10 is arranged in a manner projected into the intake pipe 3 at a location between the engine 1 and the open end 8a of the air passage 8, and is connected to a fuel pump, not shown, and also electrically connected to the ECU 9.

A throttle valve opening sensor 17 is mounted on the throttle valve 5, and an absolute pressure sensor 12 is provided in communication with the intake pipe 3 through a conduit 11 at a location downstream of the open end 8a of the air passage 8, while an engine cooling water temperature sensor 13 and an engine rpm sensor 14 are both mounted on the body of the engine 1. All the sensors are electrically connected to the ECU 9. Reference numeral 15 designates electrical devices such as head lamps and an air conditioner, which are electrically connected to the ECU by way of a switch 16, and 18 a warning device also electrically connected to the ECU 9.

The idling rpm feedback control system constructed as above operates as follows: Responsive to a signal indicative of the throttle valve opening value from the throttle valve opening sensor 17, the ECU 9 determines whether or not the above value is normal, in a manner hereinafter explained in detail, and if the above throttle valve opening value is found to be normal, the ECU 9 adopts this value as effective one of the engine operating parameters and stores it accordingly. Other engine operation parameter signals generated by the absolute pressure sensor 12, the engine cooling water temperature sensor 13, and the engine rpm sensor 14 are supplied to the ECU 9. Then, the ECU 9 determines operating conditions of the engine 1 and electrical loads on same on the basis of the read values of these engine operation parameters and a signal indicative of electrical loads on the engine supplied to the ECU 9 from the electrical devices 15, and then calculates a desired quantity of fuel to be supplied to the engine 1, that is, a desired valve opening period of the fuel injection valve 10, and also a desired quantity of supplementary air to be supplied to the engine 1, that is, a desired valve opening period of the control valve 6, on the basis of the determined operating conditions of the engine and electrical loads on the engine. Then, the ECU 9 supplies driving pulses corresponding to the calculated values to the fuel injection valve 10 and the control valve 6.

The control valve 6 has its solenoid 6a energized by each of its driving pulses to open its valve body 6b, thereby opening the air passage for a period of time corresponding to its calculated valve opening period value so that a quantity of supplementary air corresponding to the calculated valve opening period value is supplied to the engine 1 through the air passage 8 and the intake pipe 3.

The fuel injection valve 10 is energized by each of its driving pulses to open for a period of time corresponding to its calculated valve opening period value to inject fuel into the intake pipe 3. The ECU 5 operates so as to supply an air/fuel mixture having a predetermined air/fuel ratio, e.g. a theoretical air/fuel ratio, to the engine 1.

When the valve opening period of the control valve 6 is increased to increase the quantity of supplementary air, an increased quantity of the mixture is supplied to the engine 1 to increase the engine output, resulting in an increase in the engine rpm, whereas a decrease in the above valve opening period causes a corresponding decrease in the quantity of the mixture, resulting in a decrease in the engine rpm. In this manner, the engine speed is controlled by controlling the quantity of supplementary air or the valve opening period of the control valve 6.

On the other hand if the ECU 9 determines that the value of the signal indicative of the throttle valve opening is abnormal, the ECU 9, for example, warns the driver of the malfunctioning of the throttle valve opening detecting system by actuating a warning device 18. At the same time, the ECU opens the control valve 6 to the full opening by setting to 100 percent the ratio of the control valve opening period DOUT to the interval between two adjacent pulses of a signal indicative of a predetermined crank angle of the engine, for example, a top dead center (TDC) signal (hereinafter called "duty factor"), in a manner hereinafter explained in detail. Further, the ECU 9 sets the throttle valve opening value to a predetermined value stored therein and directly applicable in the event of abnormality in the throttle valve opening detecting system, and calculates the duty factor for the valve opening of the fuel injection valve 10 corresponding to the above value. In this way, the ECU 9 opens the fuel injection valve 10 on the basis of the above calculated duty factor to supply the engine 1 with an air/fuel mixture necessary for smooth operation of the engine.

The operation by which the ECU 9 determines the abnormality in the throttle valve opening detecting system will now be described in detail, with reference to FIG. 2.

Figure 2:
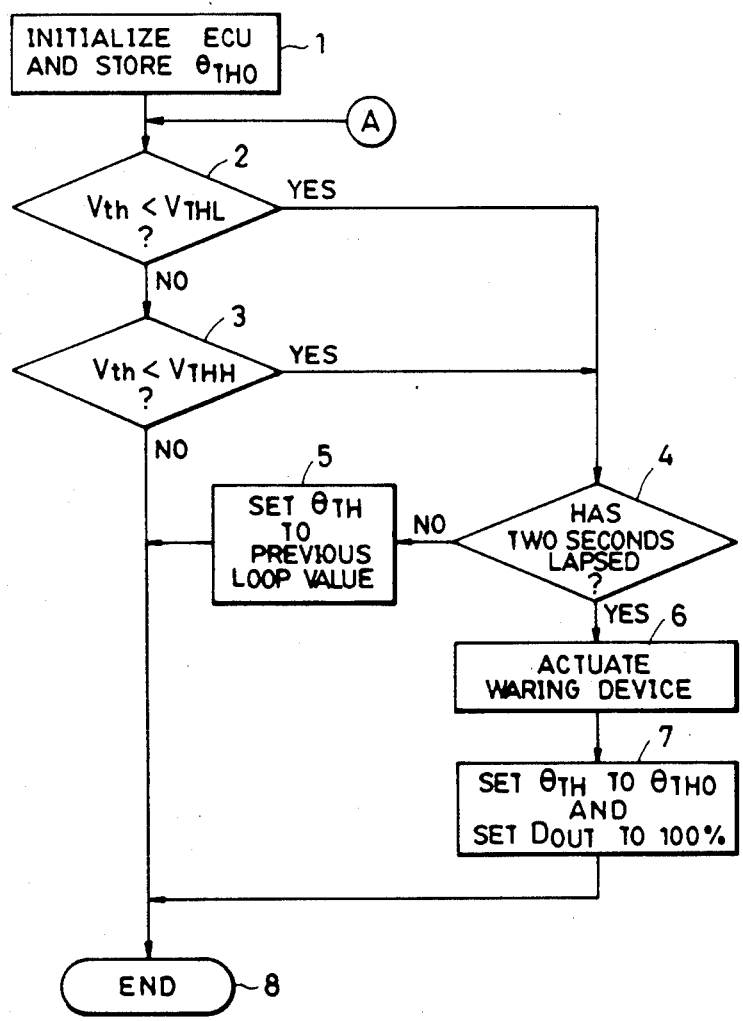
FIG. 2 is a flow chart showing a subroutine for determining whether or not there is any abnormality in the value of a signal indicative of the throttle valve opening from the throttle valve opening detecting means, executed within the electronic control unit (ECU) in FIG. 1.

FIG. 2 shows part of a program for controlling the control valve 6 and the fuel injection valve 10, executed within the ECU 9. Each time each pulse of the TDC signal from the engine rpm sensor 14, is inputted to the ECU, the program of FIG. 2 is executed, starting from entry A. First, the ECU 9 is initialized simultaneously with the starting of the engine, that is, when the ignition switch (not shown in FIG. 1) is turned on. At this stage, the ECU 9 stores into a register therein a predetermined throttle valve opening value $\theta$THO for application when any abnormality occurs in the throttle valve opening value detecting system (step 1 in FIG. 2). Next, at the step 2, it is determined whether or not the output voltage VTH from the throttle valve opening sensor 17 is lower than a predetermined lower voltage limit VTHL. This predetermined lower voltage limit VTHL is set at a value not yielded during normal operation of the throttle valve opening sensor 17 and is a value lower than the voltage output during normal operation of the throttle valve opening sensor 17 when the throttle valve is fully closed (e.g. 0.1 V). If the answer to the question in the step 2 is yes (VTH<VTHL), that is, if there is an abnormality in the output value of the throttle valve opening sensor 17, the program proceeds to the step 4.

On the other hand, if the answer to the question in the step 2 is no (VTH≧VTHL), the program proceeds to the step 3. At the step 3, it is determined whether or not the output voltage VTH of the throttle valve opening sensor 17, is higher than a predetermined upper voltage limit VTHH. This predetermined upper limit VTHH is set at a value not yielded during normal operation of the throttle valve opening sensor 17 even when the throttle valve 5 is fully opened. (e.g. 4.9 V). If the answer to the question in the step 3 is yes (VTH>VTHH), that is, if it is determined that there is an abnormality in the value outputted by the throttle valve opening sensor 17, the program proceeds to the step 4. On the other hand, if the answer to the question in the step 3 is no, (that is, VTH≦VTHH), it is determined that the output value of the throttle valve opening sensor is within a predetermined normal value range and the program is terminated (step 8).

When the output voltage from the throttle valve opening sensor 17 is found to be outside the range between abovesaid predetermined upper and lower limits, it is determined at the step 4 whether or not such an abnormal output has continued for a predetermined period of time (e.g. 2 seconds). That is, until after abnormal output has continued past the above predetermined period of time, it is not concluded that there is an abnormality in the throttle valve opening detecting system, including the throttle valve opening sensor 17. This time lag of 2 seconds is necessary to avoid executing any misconceived counteraction when the malfunctioning signal happens to be due to the influence of external noise or other factors on the throttle valve opening sensor 17 or its related wiring system. If the answer to the question in the step 4 is no (that is, below 2 seconds), the throttle valve opening value $\theta$TH is held at the stored value of the previous loop (step 5).

If the answer to the question in the step 4 is yes (that is, over 2 seconds), it is concluded that there is an abnormality in the throttle valve opening detecting system, and countermeasures in response to such abnormality provided in the steps 6 and 7 are executed. That is, at the step 6, the warning device 18 shown in FIG. 1 is actuated to light up a warning lamp, for instance, thereby informing the driver of the malfunctioning of the throttle valve opening detecting system. Next, at the step 7, the duty factor DOUT of the control valve 6 is set to 100 percent while at the same time the throttle valve opening value $\theta$TH is set to a predetermined throttle valve opening value $\theta$THO (e.g. 20°). In this way, the control valve 6 is maintained in a fully opened state maximizing the quantity of supplementary air supplied to the engine thereby preventing engine stall even if maximum engine load that can be applied on the engine at engine idling is applied on the engine. By the use of a fixed predetermined throttle valve opening value $\theta$THO irrespective of the actual throttle valve opening value, the ECU 9 calculates the best suitable duty ratio for the fuel injection valve 10 without making a wrong diagnosis that the engine is operating in the fuel-cut region or in another particular operating region, thereby ensuring smooth operation of the engine.

Although the program is terminated once the countermeasures in the step 6 and the step 7 are executed, it is arranged so as to continue the execution of these countermeasures in subsequent loops until the throttle valve opening detecting system is repaired so as to function normally.

Figure 3:
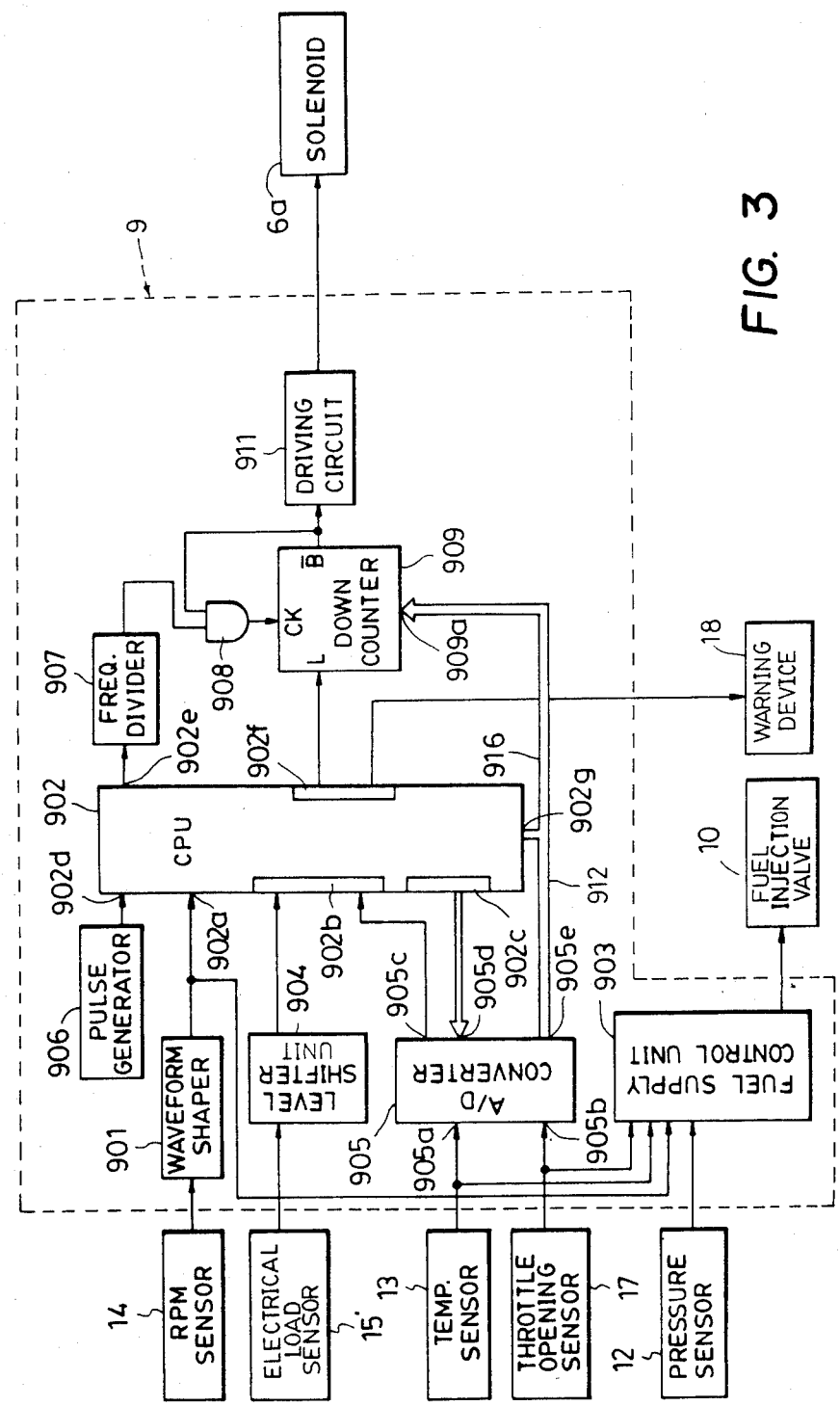
FIG. 3 is a circuit diagram illustrating an electrical circuit within the ECU in FIG. 1.

Next, the electrical circuit in the ECU 9 will now be described by referring to FIG. 3 which illustrates an embodiment thereof.

The engine rpm sensor 14 in FIG. 1 is connected to an input terminal 902a of a one chip CPU (hereinafter merely called "CPU") 902 by way of a waveform shaper 901, both provided in the ECU 9. Reference numeral 15' represents sensor means for detecting the electrical loads of the electrical devices 15 in FIG. 1, which are connected to respective ones of a group of further input terminals 902b of the CPU 902 by way of a level shifter 904 in the ECU 9. The water temperature sensor 13 and the throttle valve opening sensor 17 are connected, respectively, to input terminals 905a and 905b of an alalog-to-digital converter 905. The analog-to-digital converter 905 has an output terminal 905c connected to the input terminals 902b of the CPU 902 and a group of further input terminals 905d connected to a group of output terminals 902c of the CPU 902. A pulse generator 906 is connected to another input terminal 902d of the CPU 902 which in turn has an output terminal 902e connected to an AND circuit 908 at its one input terminal, by way of a frequency divider 907. The AND circuit 908 has its output connected to a clock pulse input terminal CK of a down counter 909. The AND circuit 908 has its other input terminal connected to a borrow output terminal $\overline{B}$ of the down counter 909 which terminal is further connected to the solenoid 6a of the control valve 6 in FIG. 1, by way of a solenoid driving circuit 911. The CPU 902 has another group of output terminals 902f, one of which is connected to a load input terminal L of the down counter 909, while another terminal of the same group is connected to the warning device 18, shown in FIG. 1. The analog-to-digital converter 905, the CPU 902, the down counter 909 and a fuel supply control unit 903 are connected together by way of a data bus 912, respectively, at an output terminal 905e, an input and output terminal 902g, an input terminal 909a, and an input terminal 903a.

Connected to the input of the fuel supply control unit 903 is the intake air pressure or absolute pressure sensor 12, shown in FIG. 1. The output of the fuel supply control unit 903 is connected to the fuel injection valve 10 in FIG. 1.

The electrical circuit of the ECU 9 constructed above operates as follows: An output signal from the engine rpm sensor 14 is supplied to the ECU 9 as a signal indicative of engine rpm Ne as well as a signal indicative of a predetermined crank angle of the engine 1 (e.g. TDC signal), where it is subjected to waveform shaping by the waveform shaper 901 and then supplied to the CPU 902 and the fuel supply control unit 903. Upon being supplied with this top dead center signal (TDC), the CPU 902 generates a chip selecting signal, a channel selecting signal, an analog-to-digital conversion starting signal, etc. commanding the analog-to-digital converter 905 to convert analog signals such as the engine cooling water temperature signal and the throttle valve opening signal from the cooling water temperature sensor 13 and the throttle valve opening sensor 17 into corresponding digital signals. The digital signals indicative of the cooling water temperature and the throttle valve opening from the converter 905 are supplied as data signals to the CPU 902 via the data bus 912 when a signal indicative of termination of each analog-to-digital conversion is supplied to the CPU 902 through the output terminal 905c of the analog to digital converter 905. Upon completion of inputting of one of these digital signals to the CPU 902, the same process as above is once again effected to cause inputting of the other digital signal to the CPU 902.

If the CPU 902 determines that there is no abnormality in the above throttle valve opening value obtained in the above described manner, on the basis of the routine of checks shown in FIG. 2, then the CPU 902 directly supplies this throttle valve opening value and the value of the signal indicative of the engine cooling water temperature to the fuel supply control unit 903 by way of the data bus 912. On the other hand, if there is an abnormality in the above throttle valve opening value, the CPU 902 sets the throttle valve opening value to the predetermined value $\theta$THO and supplies this predetermined value and the value of the signal indicative of the engine cooling water temperature to the aforesaid fuel supply control unit 903. Further, an electrical load indicative signal from the electrical load sensor means 15' has its voltage level shifted to a predetermined level by the level shifter 904 and then applied to the CPU 902. The CPU 902 operates on these input signals, that is, the throttle valve opening value signal determined to be free from any abnormalities in its voltage level, the engine rpm signal, the engine cooling water temperature signal, and the electrical load indicative signal to determine whether or not the present operating condition of the engine requires supply of supplementary air to the engine in a feedback manner to control the engine rpm. The manner of determination is, for example, such that the magnitude of the engine load at engine idle is estimated depending upon the values of the engine water temperature indicative signal and the electrical load indicative signal, upper and lower limits of a desired idling rpm range within which the engine rpm is to be controlled in feedback mode are set to values corresponding to the estimated magnitude of the engine load, and then it is determined whether or not the engine rpm is within the desired idling rpm range defined by the upper and lower limits thus set while the engine is idling with its throttle valve fully closed. If the CPU 902 determines that the engine is operating in the above idling condition requiring the feedback control, then the CPU 902 calculates the duty factor DOUT for the control valve 6 so as to bring the engine rpm to the above desired idling rpm. This duty factor is calculated, for example, by determining the difference between the actual engine rpm and the desired idling rpm and setting the above duty factor in response to this difference so as to make it zero. Then, the CPU 902 supplies the resulting calculated value of the duty factor to the down counter 909 via the data bus 912, upon inputting of a command signal to the down counter 909 through its load input terminal L, to start counting of the counter 909.

On the other hand, a clock signal generated by the pulse generator 906 is used as a timing signal for the control operation carried out by the CPU 902, and at the same time it is subjected to frequency division by the frequency divider 907 into a suitable frequency and then supplied to one input terminal of the AND circuit 908.

When the down counter 909 is supplied with a starting command signal from the CPU 902, it is loaded with a calculated value of the duty factor indicative of the desired valve opening period DOUT of the control valve 6, supplied from the CPU 902. At the same time, the down counter 909 generates a high level output of 1 at its borrow output terminal $\overline{B}$ and applies it to the other input terminal of the AND circuit 908 as well as the solenoid driving circuit 911. The solenoid driving circuit 911 energizes the solenoid 6a of the control valve 6 to open same as long as it is supplied with the above high level output of 1 from the down counter 909.

As long as the AND circuit 908 has its other input terminal supplied with the above high level output of 1 from the down counter 909, it allows clock pulses supplied thereto through its one input terminal to be applied to the clock pulse input terminal CK of the down counter 909. The down counter 909 counts the clock pulses, and upon counting up to a number corresponding to the calculated value of the duty ratio for the valve opening period DOUT of the control valve 6 supplied thereto from the CPU 902, it generates a low level output of 0 through its borrow output terminal $\overline{B}$ to cause the solenoid driving circuit 911 to deenergize the solenoid 6a of the control valve 6. At the same time, the above low level output of the down counter 909 is supplied to the AND circuit 908 as well, to interrupt the supply of further clock pulses to the down counter 909.

When the CPU 902 judges that the engine is operating in an operating condition not requiring the feedback control, at engine idle, no starting command signal is transmitted from the CPU 902 to the down counter 909 and accordingly the down counter 909 and the solenoid driving circuit 911 remain inoperative, thereby maintaining the control valve 6 fully closed.

Further, when the CPU 902 determines that there is an abnormality in the throttle valve opening detecting system due to the value of the throttle valve opening signal being outside the range between the predetermined upper and lower voltage limits VTHH and VTHL shown in FIG. 2, the CPU 902 supplies an operating command signal to the warning device 18 to actuate the same, and at the same time sets the duty factor DOUT for the control valve 6 to 100 percent. Then, the CPU 902 supplies this duty factor to the down counter 909 in the same way as described before, to hold the control valve 6 fully opened. Moreover, when any abnormalities occur in the throttle valve opening detecting system, even if the engine is operating in an operating condition not requiring the supply of supplementary air to the engine, the CPU 902 maintains the control valve 6 in a fully opened state, without limiting such action only to engine operation necessitating the idling rpm feedback control.

On the other hand, the fuel supply control unit 903 operates on engine operation parameter signals supplied from the engine rpm sensor 14, the engine water temperature sensor 13, the throttle valve opening sensor 17, and the absolute pressure sensor 12 to calculate a desired value of fuel supply quantity so as to keep the air/fuel ratio of the mixture being supplied to the engine 1 at an optimum value, e.g. a theoretical air/fuel ratio, and to open the fuel injection valve 10 for a period of time corresponding to the calculated value.

Further, when the CPU 902 calculates the aforesaid valve opening period, if it is determined that there is an abnormality in the functioning of the throttle valve opening detecting means, the CPU 902 substitutes the aforesaid predetermined throttle valve opening value $\theta$THO for the actual throttle valve opening value of the signal from the throttle valve opening sensor 17, to calculate the valve opening period for the fuel injection valve 10 by the use of this predetermined throttle valve opening value $\theta$THO.

Figure 4:
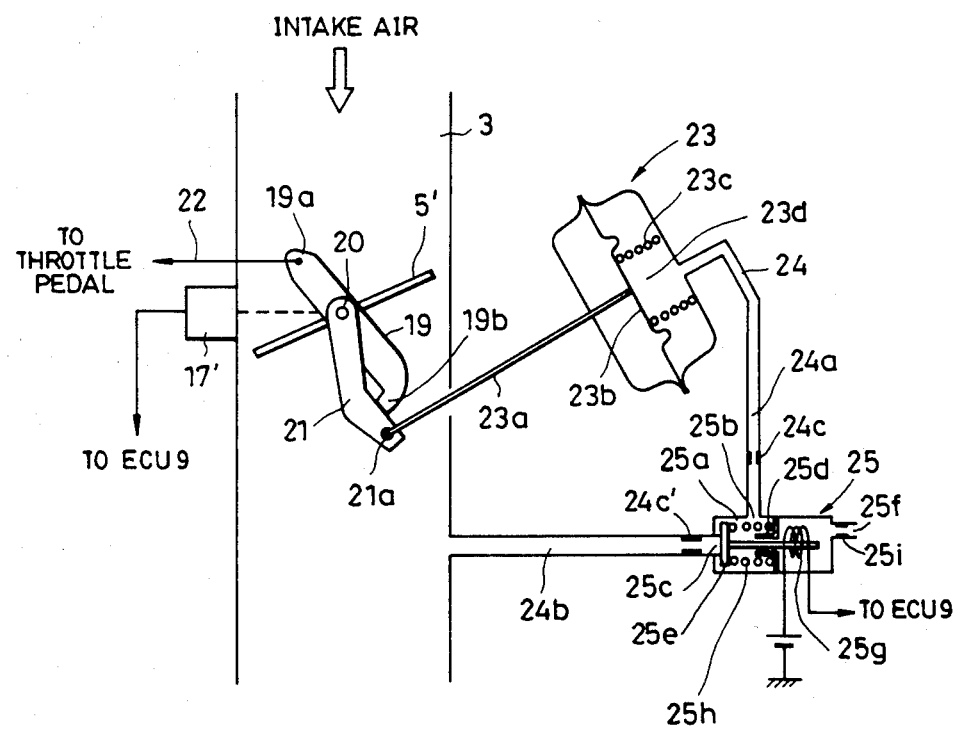
FIG. 4 shows another example of the supplementary air quantity control means applicable to the method of the invention, that controls the throttle valve opening to regulate the quantity of supplementary air being supplied to the engine.

FIG. 4 illustrates another example of the supplementary air quantity control means, which may be used in lieu of the control valve 6, shown in FIG. 1, and which is adapted to control the supply of supplementary air to the engine in response to negative pressure by controlling the throttle valve opening value.

The throttle valve 5', shown in FIG. 4, is arranged in the intake passage 3 in place of the throttle valve 5 in FIG. 1, and is formed integrally with a lever 19 for rotation about a fulcrum 20 on the valve 5'. A second lever 21 is mounted at one end on the same fulcrum 20 on the valve 5' for pivotal movement thereabout. On the other end 21a of the lever 21 is attached a rod 23a of a negative pressure operated actuator 23. The lever 19 is arranged on the fulcrum 20 has its arms extending in opposite directions from the fulcrum 20. A throttle pedal (not shown in FIG. 4) is connected to one end 19a of the lever 19 by means of a wire 22. The lever 19 is disposed such that when the throttle valve 5' is in the vicinity of fully closed state, the other end 19b of the lever 19 abuts against the lever 21 at a location near its end 21a so as to limit its rotational angle, i.e. the rotation of the throttle valve toward its fully closing position, in a manner hereinafter described in detail.

The negative pressure operated actuator 23 is comprised of the rod 23a disposed to push and pull the lever 21, a diaphragm 23b coupled to the rod 23a for displacement in response to the atmospheric pressure or negative pressure in the intake passage selectively applied thereto in a manner hereinafter described in detail, by a three way solenoid valve 25, and a spring 23c disposed to urge the diaphragm 23b so as to make it push down the lever 21 by means of the rod 23a. A vacuum chamber 23d is defined by the diaphragm 23b inside the negative pressure operated actuator 23. A conduit 24 communicating with the intake passage 3 at a location downstream of the throttle valve 5' arranged therein is connected to the vacuum chamber 23d, and the three way valve 25 is arranged across the conduit 24. The three way valve 25 has a valve chamber 25a which is provided with an opening 25b communicating with the vacuum chamber 23d of the negative pressure operated actuator 23 through a downstream portion 24a of the conduit 24, a second opening 25c communicating with the intake passage 3 through an upstream portion 24b of the conduit 24 and a third opening 25d communicating with the atmosphere through a communication passage 25f. The three way valve 25 further includes a valve body 25e arranged in the valve chamber 25a and urged by a spring 25h for closing the opening 25c to interrupt the communication between the vacuum chamber 23d of the negative pressure operated actuator 23 and the intake passage 3 and simultaneously establish the communication between the vacuum chamber 23d and the atmosphere by way of the opening 25d then opened, and a solenoid 25g which, when energized, forces the valve body 25e into contact with the opening 25d against the force of the spring 25h to reestablish the communication between the vacuum chamber 23d of the negative pressure operated actuator 23 and the intake passage 3. The solenoid 25g is electrically connected to the ECU 9 in FIG. 1.

A throttle valve opening sensor 17' is on one hand, mechanically connected to the throttle valve 5', and, on the other hand, is electrically connected to the ECU 9.

The operation of the supplementary air quantity control means of FIG. 4 constructed as above will now be explained.

When the throttle pedal (not shown) is not stepped on (that is, the stepping amount is zero), the throttle valve 5' is kept in a closed position (clockwise extreme position as viewed in FIG. 4) by the force of a spring, not shown, with the end 16b of the lever 19 in contact with the lever 21. Now, during the feedback control of the engine rpm at engine idling, the ECU 9 calculates the duty factor for the valve opening period of the three way valve 25 in response to the required quantity of supplementary air to be supplied to the engine, in the same manner as previously explained. The valve body 25e of the three way valve 25 has its solenoid 25g energized with a pulse duty factor corresponding to the above calculated duty factor and in synchronism with generation of the TDC pulse signal. As long as the solenoid 25g is energized, the opening 25c is opened to introduce the negative pressure from a location downstream of the throttle valve 5' in the intake passage 3 into the vacuum chamber 23d of the negative pressure operated actuator 23, thereby determining the amount of negative pressure in the vacuum chamber 23d. In other words, the value of negative pressure occurring in the vacuum chamber 23d is determined by the time ratio between communication of the vacuum chamber 23d with the intake passage 3 and communication of the same chamber 23d with the atmosphere, which ratio corresponds to the above duty ratio with which the valve body 25e is repeatedly opened and closed in synchronism with generation of the TDC pulse signal. In this way, the larger the duty factor, the higher the negative pressure in the vacuum chamber 23d becomes. The downstream portion 24a and the upstream portion 24b of the conduit 24 and the passage 25f through which the three way valve 25 communicates with the atmosphere are all provided with orifices 24c, 24c' and 25i respectively arranged therein, thereby enabling not only to obtain a best suitable response of the diaphragm 23b but also to prevent abrupt fluctuations in the pressure of the vacuum chamber 23d.

When the negative pressure in the vacuum chamber 23d increases, the diaphragm 23b is displaced in response to the difference between the pressures applied on its opposite sides, against the force of the spring 23c in a direction decreasing the volume of the vacuum chamber 23d (the right and upward direction as viewed in FIG. 4), thereby causing the lever 21 to rotate in the counterclockwise direction by means of the rod 23a connected to the diaphragm 23b. This causes both the lever 19 and the throttle valve 5' formed integrally with the lever 19 to rotate about the fulcrum 20 so as to open the throttle valve 5' to supply the required quantity of supplementary air to the engine 1.

When the supply of supplementary air to the engine becomes unnecessary, the ECU 9 sets the duty factor for the three way valve 25 to zero to deenergize the solenoid 25g. Therefore, the valve body 25e of the three way valve 25 closes the opening 25c and opens the opening 25d, thereby causing the vacuum chamber 23d to communicate with the atmosphere, so as to make the difference between the pressures on opposite sides of the diaphragm 23b become zero so that the diaphram is displaced by the force of the spring 23c in a direction increasing the volume of the vacuum chamber 23d (the left and downward direction as viewed in FIG. 4), pushing down the lever 21 by means of the rod 23a thereby causing the throttle valve 5' to be returned to a fully closed position by the force of the spring, not shown.

On this occasion, when the throttle pedal is stepped on, the lever 19 is rotated by way of the wire 22, in the counterclockwise direction, causing the throttle valve 5' also to open to an opening corresponding to the throttle pedal stepping-on amount. Further, when the throttle pedal is stepped on, the lever 21 remains at its previous position as it is unaffected by the rotation of the lever 19.

The operation described above is applied when a normal value of the throttle valve opening value signal is supplied to the ECU 9, without any abnormality occurring in the throttle valve opening detecting system including the throttle valve opening sensor 17'. When any abnormality occurs in the throttle valve opening detecting system, the ECU 9 sets the duty factor of the three way valve 25 to 100 percent as previously explained with reference to FIG. 2 and FIG. 3. More specifically, after any abnormality has occurred in the throttle valve opening detecting system, the solenoid 25g of the three way valve 25 is maintained in an energized state, causing the valve body 25e to close the opening 25d and open the opening 25c, thereby maximizing the negative pressure in the vacuum chamber 23d of the negative pressure operated actuator 23, that is, to make it equal to the negative pressure in the intake passage 3 downstream of the throttle valve 5', thereby maximizing the displacement of the diaphragm 23b, causing the lever 21 to be pulled up by means of the rod 23a, in turn causing the throttle valve 5' to open to a predetermined maximum opening value, to supply the maximum quantity of supplementary air required for the engine at engine idling with the maximum engine load applied on the same.

In the case of the above throttle valve opening control for the purpose of regulating the supply of supplementary air to the engine, such control may be effected by any other suitable supplementary air quantity control means than the one illustrated, for example, the rod 23a may be directly operated by the solenoid in place of the negative pressure operated actuator 23.

What is claimed is:

1. An idling rpm feedback control method adapted to control a supplementary air quantity control means for regulating the quantity of supplementary air being supplied to an internal combustion engine having an intake passage and a throttle valve arranged therein, with means for detecting the throttle valve opening, in a feedback manner responsive to the difference between actual engine rpm and desired idling rpm, when at least one predetermined operating parameter of said engine including at least the opening value of said throttle valve satisfies a predetermined idle operating condition of the engine, the method comprising the steps of:
   (1) setting beforehand an abnormal value of an output signal indicative of said opening value of said throttle valve from said throttle valve opening detecting means, said abnormal value having a value which is not yielded when said throttle valve opening detecting means is operating in a normal operating condition irrespective of an actual opening value of said throttle valve;
   (2) determining whether or not said output signal indicative of said opening value of said throttle valve has said abnormal value; and
   (3) supplying a maximum quantity of supplementary air to said engine by operating said supplementary air quantity control means to an operating limit thereof, when it is determined in said step (2) that said output signal indicative of said opening value of said throttle valve has said abnormal value, said maximum quantity of supplementary air being set at a value which makes it possible for the engine to sustain operation thereof even if the engine is subjected to a maximum load thereon that can be applied to the engine at idling.

2. An idling rpm feedback control method as claimed in claim 1, wherein said supplementary air quantity control means comprises a solenoid valve for regulating the quantity of supplementary air being supplied to said engine through an air passage, one end of which communicates with said intake passage at a location downstream of said throttle valve and the other end of which communicates with the atmosphere, respectively, said step (3) comprising activating said solenoid valve to a fully open position thereof.

3. An idling rpm feedback control method as claimed in claim 1, wherein said supplementary air quantity control means comprises a negative pressure-operated means for operating said throttle valve to open or close in response to negative pressure in said intake passage at a zone downstream of said throttle valve, and a negative pressure control means for controlling the value of negative pressure in said intake passage acting upon said negative pressure-operated means, said step (3) comprising controlling by means of said negative pressure control means the value of negative pressure in said intake passage to a maximum value and causing said throttle valve to open to a predetermined maximum opening by means of said negative pressure-operated means.

4. An idling rpm feedback control method as claimed in claim 1, wherein said step (1) comprises setting predetermined lower and upper limits of said output signal of said throttle valve opening detecting means, said predetermined lower limit having a value lower than a value of the output signal from said throttle valve opening detecting means operated in a normal operating condition when said throttle valve is in a fully closed position, said predetermined upper limit having a value higher than a value of the output signal from said throttle valve opening detecting means operated in a normal operating condition when said throttle valve is in a fully open position, and said step (2) comprises determining that said output signal shows said abnormal value when a condition wherein said output signal assumes a value falling outside a range between said predetermined lower and upper limits has continued over a predetermined period of time, said predetermined period of time being set at a value larger than one during which said output signal can have said abnormal value due to the influence of a factor including external noise on said throttle valve opening detecting means.

5. An idling rpm feedback control method as claimed in claim 1, wherein said engine is equipped with means for supplying an amount of fuel in dependence on at least one engine operating parameter at least including the throttle valve opening, said fuel supplying means being adapted to employ a predetermined value of said at least one engine operating parameter in place of an actual value of said output signal to thereby supply the engine with a quantity of fuel corresponding to said predetermined value, simultaneously when said step (3) is executed, if it is determined in said step (2) that said output signal shows said abnormal value.

* * * * *